United States Patent
Harmon et al.

(10) Patent No.: US 8,395,893 B2
(45) Date of Patent: Mar. 12, 2013

(54) COUPLING ASSEMBLY FOR A FOLDABLE ELECTRONIC DEVICE

(75) Inventors: Roger Harmon, Crystal Lake, IL (US); Jonathan Hewitt, Reading (GB)

(73) Assignee: Motorola Mobility, Inc., Libertyville, IL (US)

(*) Notice: Subject to any disclaimer, the term of this patent is extended or adjusted under 35 U.S.C. 154(b) by 253 days.

(21) Appl. No.: 12/980,410

(22) Filed: Dec. 29, 2010

(65) Prior Publication Data

US 2011/0157799 A1    Jun. 30, 2011

Related U.S. Application Data

(60) Provisional application No. 61/335,093, filed on Dec. 31, 2009.

(51) Int. Cl.
  G06F 1/16    (2006.01)
  G06F 3/02    (2006.01)
  H04M 1/00    (2006.01)

(52) U.S. Cl. ......... 361/679.55; 361/679.56; 361/679.26; 361/679.27; 455/575.1; 455/575.3; 455/575.4; 345/168; 345/169; 345/905

(58) Field of Classification Search ............ 361/679.01–679.45, 679.55–679.59; 455/575.1, 575.3, 455/575.4; 345/156, 157, 168, 169, 905
See application file for complete search history.

(56) References Cited

U.S. PATENT DOCUMENTS

| 5,494,447 | A | 2/1996 | Zaidan |
| 5,610,971 | A | 3/1997 | Vandivier |
| 5,898,600 | A | 4/1999 | Isashi |
| 6,233,138 | B1 | 5/2001 | Osgood |
| 6,392,870 | B1 | 5/2002 | Miller, Jr. |
| 6,532,147 | B1* | 3/2003 | Christ, Jr. ............... 361/679.27 |
| 6,549,789 | B1 | 4/2003 | Kfoury |

(Continued)

FOREIGN PATENT DOCUMENTS

| EP | 1335567 A1 | 2/2002 |
| FR | 2771769 A1 | 6/1999 |

(Continued)

OTHER PUBLICATIONS

Patent Cooperation Treaty, Search Report and Written Opinion for PCT/US2010/062393, dated Apr. 26, 2011, 11 pages.

(Continued)

Primary Examiner — Jayprakash N Gandhi
Assistant Examiner — Nidhi Desai
(74) Attorney, Agent, or Firm — The Watson I.P. Group, PLC; Jovan N. Jovanovic; Lawrence J. Chapa

(57) ABSTRACT

An electronic device comprising a first housing, a second housing and a hinge assembly. The first housing element has an inward surface and an outward surface and a side end. The second housing has an inward surface and an outward surface and a side end. The hinge assembly couples the first housing element and the second housing element about the respective side ends of the first and second housing elements, and facilitates rotation between a collapsed orientation and a deployed. The hinge assembly further includes a first hinge member and a second hinge member. The first hinge member is fixed to the first housing element. The second hinge member is slidably coupled to the second housing element. The first and second hinge members are rotatably coupled to each other about an axis of rotation, and, the second housing element rotates relative to the first housing element. Furthermore, the second housing element translates relative to the first housing element and the second hinge member between a compressed position and a fully extended position.

13 Claims, 6 Drawing Sheets

U.S. PATENT DOCUMENTS

| | | | |
|---|---|---|---|
| 7,058,433 | B2 | 6/2006 | Carpenter |
| 8,018,714 | B2 * | 9/2011 | Luke et al. ............... 361/679.01 |
| 8,284,554 | B2 * | 10/2012 | Stone et al. ............. 361/679.56 |
| 2003/0103324 | A1 | 6/2003 | Gallivan |
| 2005/0031390 | A1 | 2/2005 | Orozco-Abundis |
| 2005/0124395 | A1 * | 6/2005 | Bae et al. .................. 455/575.3 |
| 2005/0282596 | A1 | 12/2005 | Park et al. |
| 2006/0034601 | A1 | 2/2006 | Andersson et al. |
| 2006/0037175 | A1 | 2/2006 | Hyun |
| 2006/0084482 | A1 | 4/2006 | Saila |
| 2006/0111160 | A1 | 5/2006 | Lin et al. |
| 2007/0076861 | A1 * | 4/2007 | Ju ........................... 379/433.01 |
| 2007/0127199 | A1 | 6/2007 | Arneson |
| 2008/0004085 | A1 | 1/2008 | Jung et al. |
| 2008/0102888 | A1 | 5/2008 | Sellgren et al. |
| 2008/0304215 | A1 * | 12/2008 | Chiu ............................. 361/681 |

FOREIGN PATENT DOCUMENTS

| | | |
|---|---|---|
| KR | 100683535 B1 | 2/2007 |
| KR | 1020070035026 A | 3/2007 |
| WO | 2005071928 A1 | 8/2005 |
| WO | 2005111769 A2 | 11/2005 |
| WO | 2009123406 A2 | 10/2009 |

OTHER PUBLICATIONS

Korean Patent Office Notice of Preliminary Rejection for Korean Utility Model Application No. 20-2009-14304, dated Mar. 16, 2011, with English translation, 10 pages total.

Russian Patent Office Official Action for Russian Utility Model Application No. 2009140712/22(057928), dated Jan. 18, 2010, with English translation, 4 pages total.

Chinese Patent Office Notification to Make Rectification fro Chinese Patent Application for Utility Model No. 200920291306.1, dated May 13, 2010, with English translation, 3 pages total.

Taiwanese Patent Office Office Action for Taiwanese Patent Application No. 098221019, dated May 25, 2010, with English translation, 3 pages total.

Patent Cooperation Treaty, Search Report and Written Opinion for PCT/US2009/059981, dated Mar. 12, 2010, 18 pages.

* cited by examiner

COUPLING ASSEMBLY FOR A FOLDABLE ELECTRONIC DEVICE

CROSS-REFERENCE TO RELATED APPLICATION

This application claims the benefit of U.S. Provisional Patent Application Ser. No. 61/335,093 filed Dec. 31, 2009, entitled, "Electronic Device Having A Hinge With A Slidable Coupling," the entire disclosure of which is hereby incorporated by reference in its entirety.

BACKGROUND OF THE DISCLOSURE

1. Field of the Disclosure

The disclosure relates in general to an electronic device, and more particularly, to an electronic device which includes a slidable coupling that enables both rotation of the housing elements between a collapsed and a deployed orientation, and also translation of the housing elements relative to each other from a collapsed orientation to an extended orientation.

2. Background Art

The use of electronic devices, such as cellular telephones, and the like has steadily increased. In many instances the electronic devices include a first housing element and a second housing element which are in some manner coupled together so as to permit rotation of the housing elements relative to each other. As a result, the housing elements can be rotated between a collapsed orientation and a deployed orientation. For example, the device can be stored and maintained in the closed orientation when not in use and then in the deployed orientation for use.

A number of different manners in which to couple two housing elements of an electronic device have been employed. Among other structures, a single axis hinge, possibly with damping features is often used to couple the housing elements. Such single axis hinges limit the configuration of the housing elements at the region proximate the hinges so that the respective elements can remain free of interference throughout rotation between the collapsed orientation and the deployed orientation. Any interference can damage the housing and interfere with the rotation of the respective housing elements. Often, rounded edges and tight control of the side edge configuration is required to provide a compact, yet functional hinge.

What is needed is a hinge assembly which allows both rotation of housing elements relative to each other as well as slidable translating of housing elements relative to each other, so as to allow increased movement between the housing elements (and therefore greater freedom in design thereof) without interference.

SUMMARY OF THE DISCLOSURE

The disclosure is directed to an electronic device comprising a first housing, a second housing and a hinge assembly. The first housing element has an inward surface and an outward surface and a side end. The second housing has an inward surface and an outward surface and a side end. The hinge assembly couples the first housing element and the second housing element about the respective side ends of the first and second housing elements. The hinge assembly facilitates rotation between a collapsed orientation wherein the inward surfaces of the first and second housings are in an overlying orientation to a deployed orientation wherein the first and second inward surfaces are angularly disposed relative to each other.

The hinge assembly further includes a first hinge member and a second hinge member. The first hinge member is fixed to the first housing element. The second hinge member is slidably coupled to the second housing element. The first and second hinge members are rotatably coupled to each other about an axis of rotation. Thus, the second housing element rotates relative to the first housing element. Additionally the second housing element translates relative to the first housing element and the second hinge member between a compressed position and a fully extended position.

In at least one embodiment, the hinge assembly further includes a biasing member having a first end fixed to the second housing element and a second end fixed to the second hinge element. The biasing member biases the second hinge element relative to the second housing toward the compressed position.

In at least one such embodiment, the hinge assembly further includes a cam surface fixed to the first housing element and a follower coupled to the second housing element. Rotative movement of the first and second housing members about the axis of rotation then directs the follower along the cam surface. Additionally, the biasing member biases the follower against the cam surface.

In at least one such embodiment, the cam includes a profile which includes a first region corresponding to a range between the collapsed orientation and a partially deployed orientation. The first region, in cooperation with the biasing member directs the follower to the collapsed orientation.

In at least one such embodiment, rotation of the first housing element relative to the second housing element along the first region from the collapsed orientation to the partially deployed orientation translates the second housing relative to the second hinge member along the slidable coupling from the compressed position toward the extended position.

In at least one such embodiment, the profile includes a second region corresponding to a range between a partially deployed orientation and the fully deployed orientation. When the follower is biased against the cam surface in the second region thereof, the biasing member and the second region of the profile preclude movement of the follower relative to the cam surface without further user interaction. Thus, the two housing elements will tend to remain in the predetermined orientation.

In at least one such embodiment, the second region further includes at least one detent positioned in the cam surface. The detent provides a stop for the follower in a predetermined position along the second region of the profile.

In at least one embodiment, the biasing member comprises a spring. In at least one embodiment, the biasing member comprises a pressure differential device.

In at least one embodiment, the second hinge element comprises a piston member and the second housing element includes a chamber along which the piston member is slidably movable. In such a configuration, the piston member can telescope relative to the chamber. In at least one such embodiment, the biasing member is positioned within the chamber, so as to be encased therein.

In at least one embodiment, the first housing element further includes a keyboard, and the second housing element further includes a display.

In at least one embodiment, a damper is coupled to the second housing element and the second hinge element. The damper dampens translative movement of the second housing element relative to the second hinge element.

In at least one embodiment, the second hinge element is mounted in an orientation that is spaced apart from a side edge of the second housing element. As such, a portion of the second housing element extends beyond the hinge assembly.

In at least one such embodiment, the first hinge element is mounted in an orientation that is less spaced apart from a side edge of the first housing element than the second hinge element is spaced apart from the side edge of the second housing element. As a result, a portion of the second housing element extends beyond the side edge of the first housing element. This portion that extends beyond the side edge of the first housing element defines an overhanging portion of the second housing element when the first and second housing elements are in a collapsed orientation.

BRIEF DESCRIPTION OF THE DRAWINGS

The disclosure will now be described with reference to the drawings wherein.

DETAILED DESCRIPTION OF THE DISCLOSURE

Figure 1:
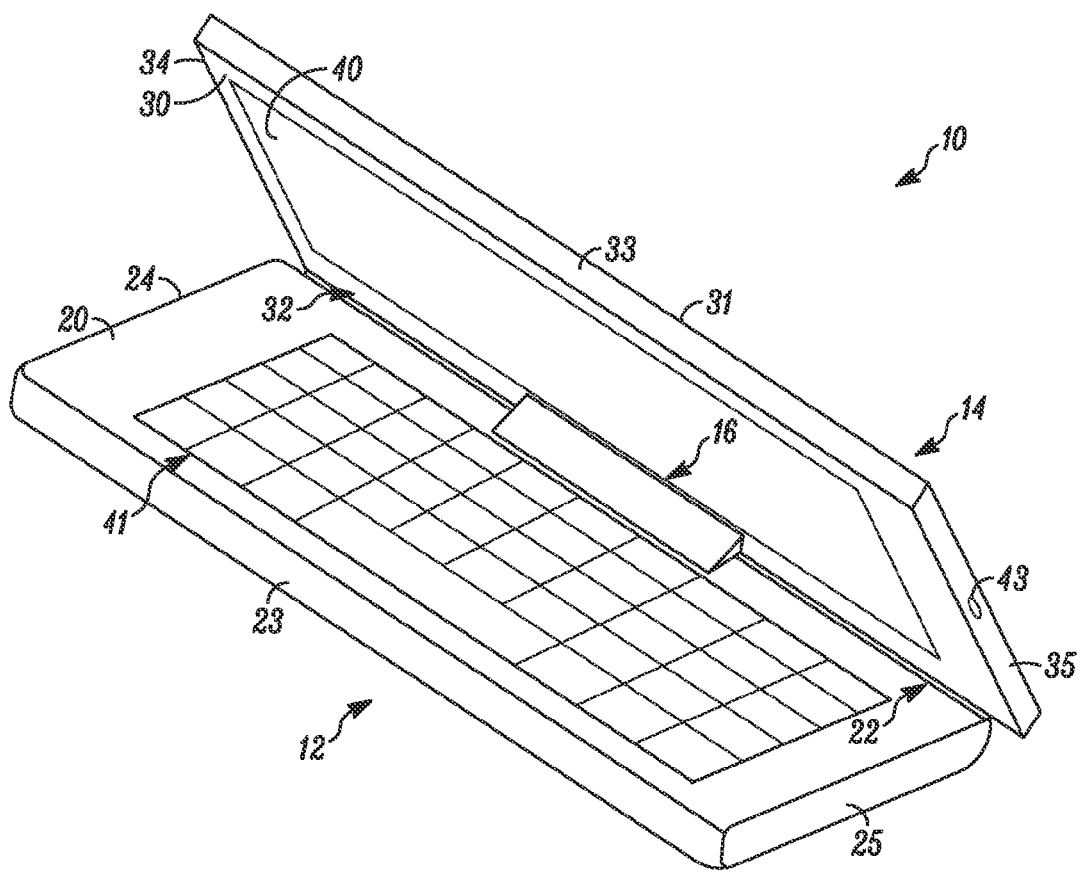
FIG. 1 of the drawings is a perspective view of the electronic device of the present disclosure, showing, in particular, the first housing element and the second housing element between the collapsed orientation and the deployed orientation.

While this disclosure is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the disclosure, and some of the components may have been distorted from actual scale for purposes of pictorial clarity.

Referring now to the drawings and in particular to FIG. 1, an electronic device is shown generally at 10. The electronic device may comprise a cellular telephone, although it is not limited to a cellular telephone. Indeed, other foldable electronic devices are likewise contemplated for use, such as a two-way radio, pager, smartphone, personal digital assistant, netbook, notebook computer and the like.

In one embodiment, the foldable electronic device 10 comprises a first housing element 20, a second housing element 22 which is pivotably coupled through the use of a hinge assembly 16 so as to pivot or flip between a collapsed orientation and a deployed orientation.

In a cellular telephone embodiment, for example, the first housing element 12 includes a keyboard 41. The second housing element 14 includes, among other elements display 40. It will be understood that the first and second housing element embodiments are not to be deemed limiting and are deemed to be exemplary. For example, it will be understood that the components may be swapped between the first and second housing elements without departing from the scope of the disclosure.

In the embodiment described and shown in FIG. 1, first housing element 12 includes inward surface 20, outward surface 21 (FIGS. 3a and 3b), inner side end 22, outer side end 23 and opposing edges 34, 35. The various electronic components are housed within or on the surface of the first housing element. The first housing element may comprise a plastic or a metal construction and often includes a chassis that is surrounded by a plurality of panels. It will be understood that while the first housing element is shown as having a display on its inward surface, it may likewise include a display on its outward surface or a display solely on the outward surface. In addition, a keyboard may be present on either the inward or the outward surface of the first housing element.

Figure 3A:
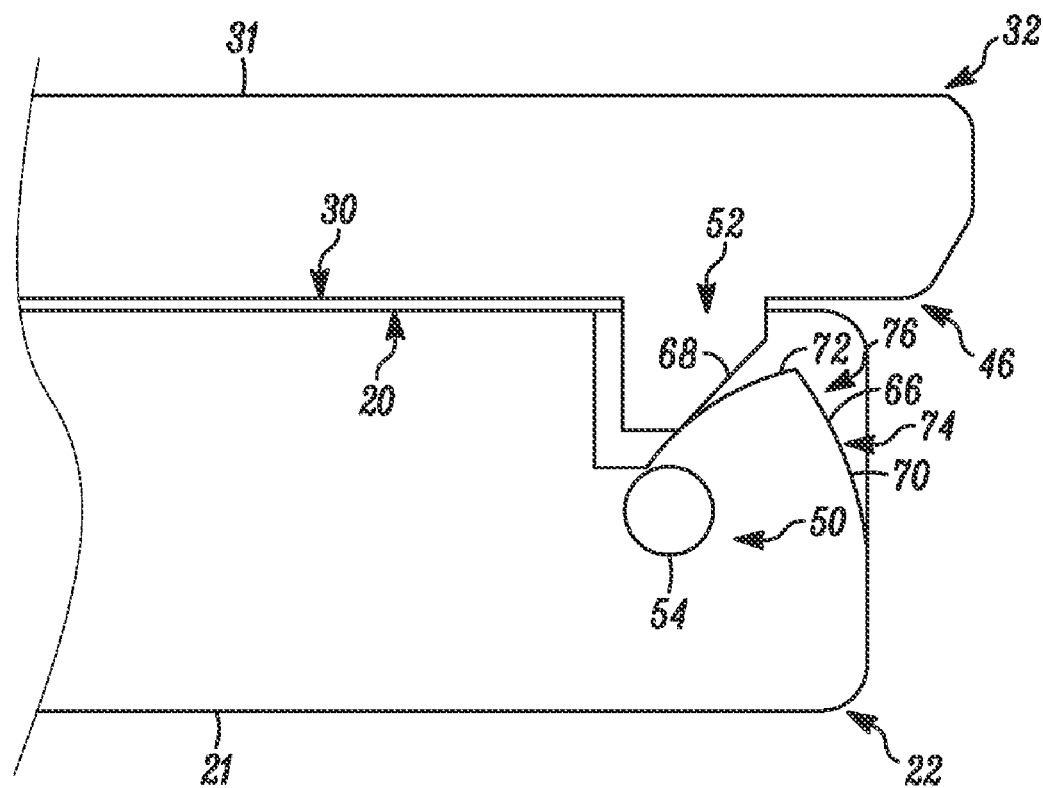
FIG. 3a of the drawings is a partial side elevational view of the electronic device of the present disclosure, showing, in particular, the cam surface and the follower of the hinge assembly of the present disclosure in the collapsed orientation.
Figure 3B:
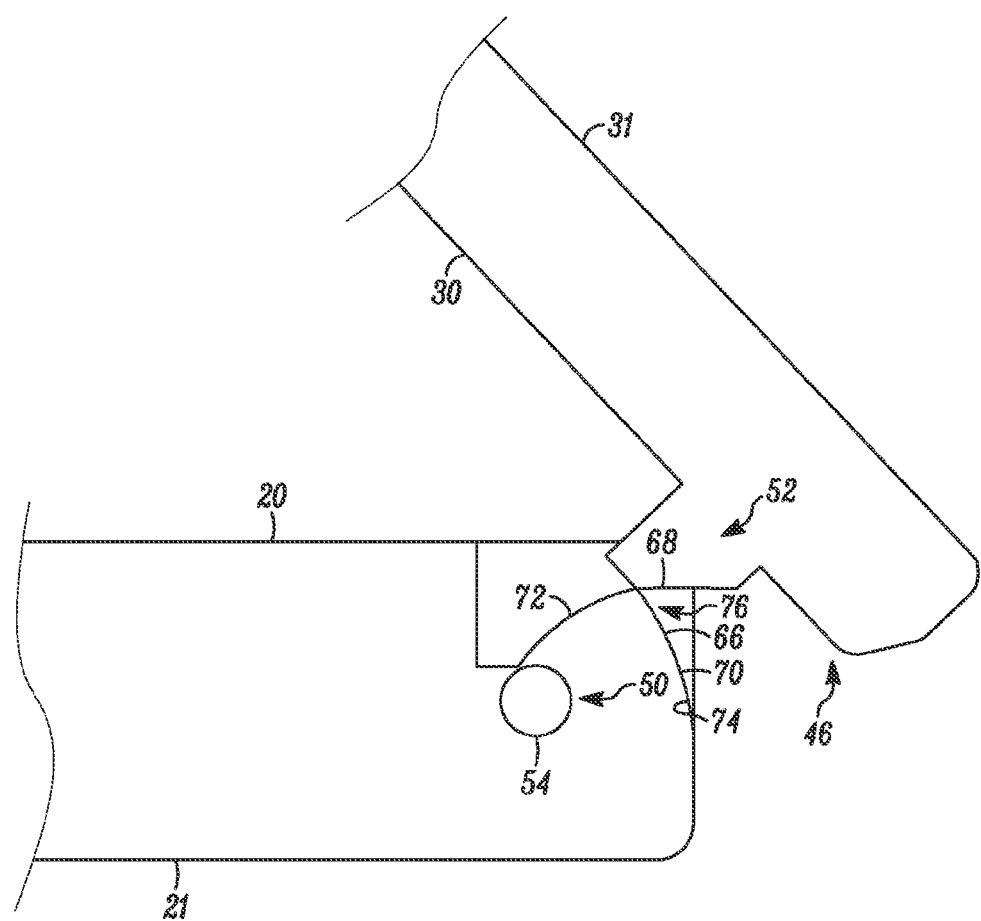
FIG. 3b of the drawings is a partial side elevational view of the electronic device of the present disclosure, showing, in particular, the cam surface and the follower of the hinge assembly of the present disclosure between the collapsed orientation and the deployed orientation.

The second housing element 14 includes inward surface 30, outward surface 31, inner side end 32, outer side end 33 and opposing edges 34, 35. Although not required, the first and second housing elements are sized so that they generally overlie each other with possible overhang of one housing element relative to the other housing element about one of the sides or the end. Advantageously, and as is shown in FIGS. 3a and 3b, the hinge assembly of the present disclosure, the second housing element can overhang the first housing element proximate the inner side ends at the hinge assembly defining overhang 46. The second housing element, like the first comprises a base chassis with panels that form an enclosure and to which various electronic and structural components may be attached. It will be understood that in such an embodiment, a keyboard may be present on the inward surface. It will be understood that a display may also be positioned on such a surface in addition to the keyboard or in place of the keyboard. Of course, other structures are likewise contemplated for inclusion onto the inward and/or outward surfaces of the second housing element.

Figure 2A:
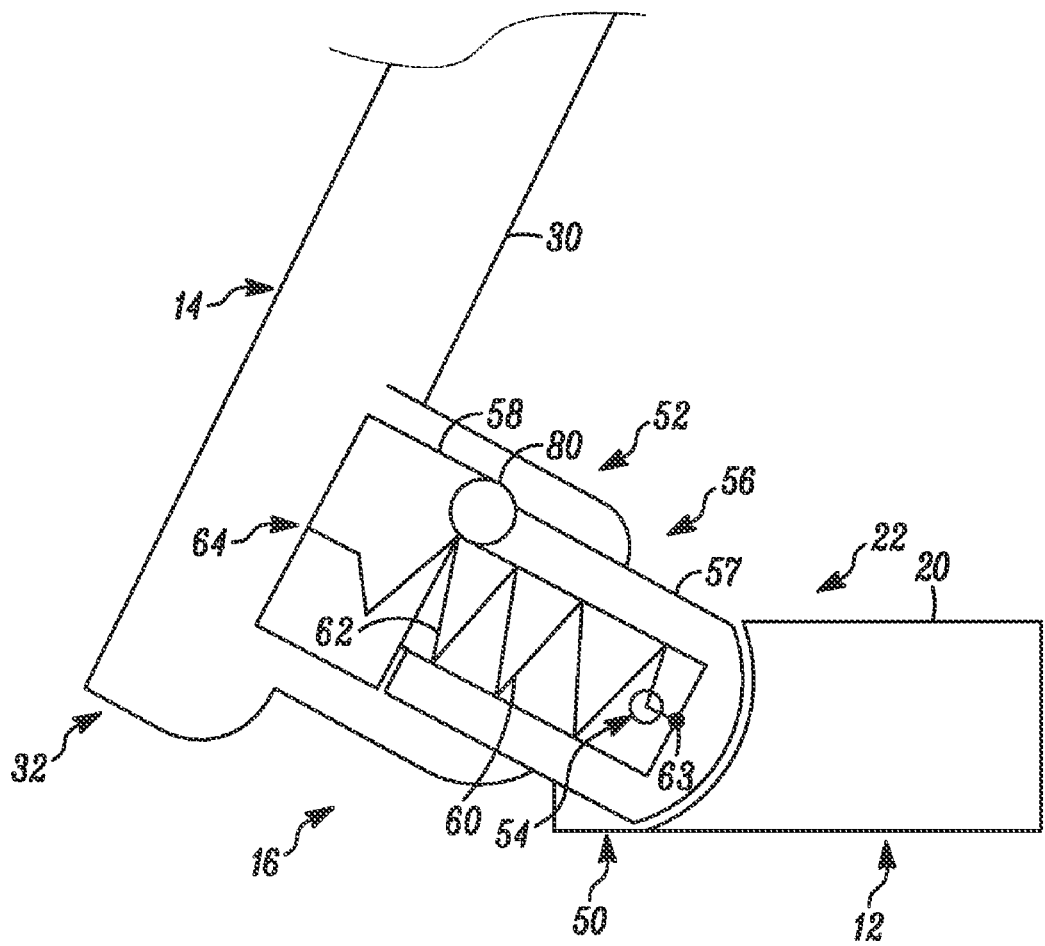
FIG. 2a of the drawings is a partial side elevational view of the electronic device of the present disclosure, showing, in particular, the slidable coupling and the biasing member of the present disclosure.

Hinge assembly 16 is shown in FIG. 2a as comprising first hinge member 50, second hinge member 52 which rotate relative to each other about axis of rotation 54, such that the second housing element 14 rotates relative to the first housing element 12 between a collapsed orientation wherein the inward surfaces 20, 30 of the first and second housings, respectively, are in an overlying orientation to a deployed orientation wherein the first and second inward surfaces 20, 30, respectively are angularly disposed relative to each other.

The hinge assembly further includes a slidable coupling 56 which allows the second housing element to translate relative to the first housing element and the second hinge member between a compressed position and a fully extended position. As such, the separation between the inward surfaces 20, 30 can be altered when in the fully compressed orientation, for example. The slidable coupling further includes piston 57 and chamber 58. It will be understood that the piston 57 is configured to slide within the confines of chamber 58 as the slidable coupling is translated between a compressed position and a fully extended position. The second hinge member is, for example coupled to the piston or the chamber, and the second housing is coupled to the other of the piston or chamber. In other embodiments, other members, such as some that allow for a telescopic slidable configuration are likewise contemplated.

Figure 2B:
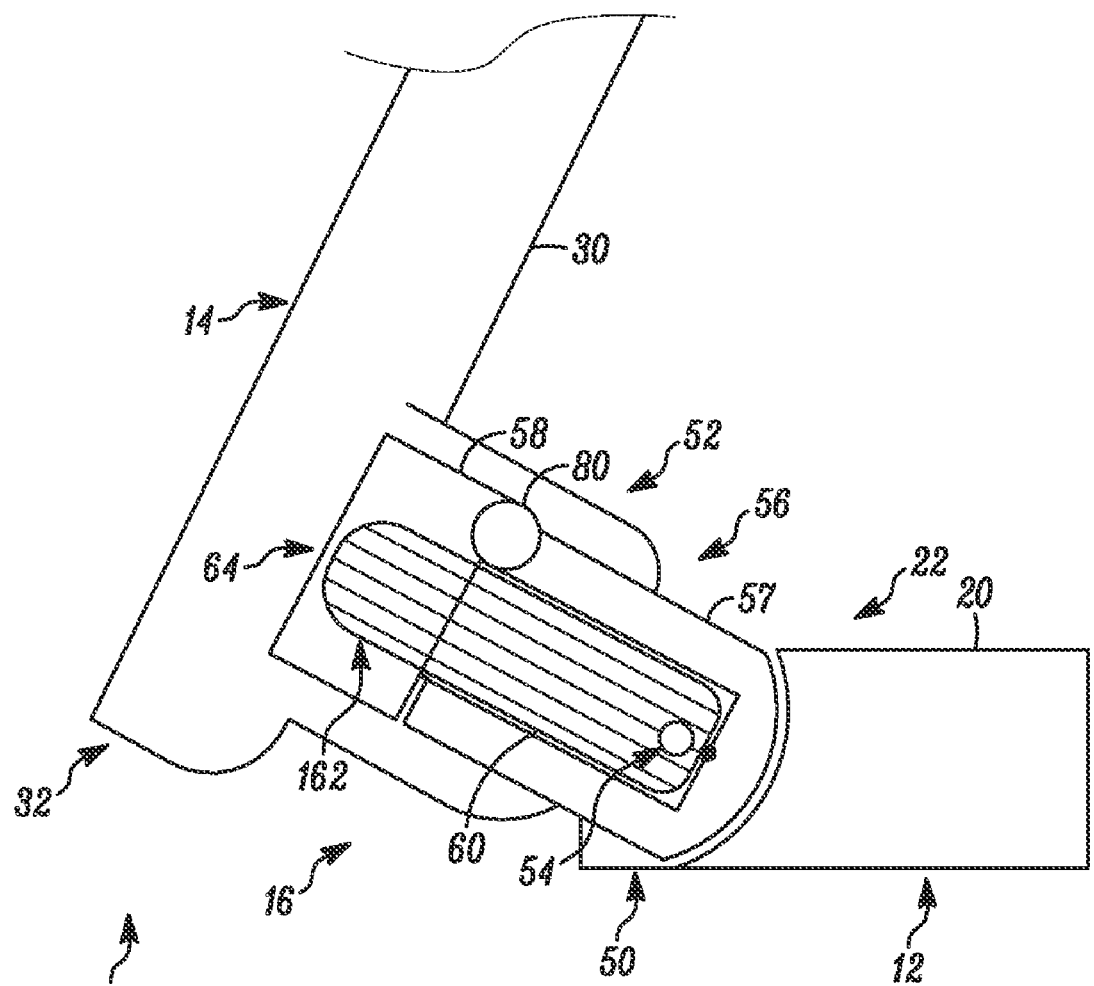
FIG. 2b of the drawings is a partial side elevational view of the electronic device of the present disclosure, showing, in particular, the slidable coupling and another biasing member of the present disclosure in the form of a pressure differential device.

The hinge assembly further includes biasing member 60 which comprises spring 62, for example. The spring includes a first end 63 coupled to the piston 57 and a second end 64 coupled to chamber 58. The spring biases the hinge slidable coupling into compressed position. In other embodiments, such as the embodiment shown in FIG. 2b, it is contemplated that the biasing member 60 comprise a pressure differential device 162. In such a device, the stable equilibrium is reached when the slidable coupling is in the compressed position. When directed out from the compressed position, a change in volume, or a change in pressure is realized, whereupon the pressure differential device is directed the housing elements back to the compressed position.

With reference to FIGS. 3a and 3b, to direct the path of the slidable coupling 56, and in turn, the translative movement of the first housing element relative to the second housing element, a cam surface 66 is provided on the first housing element, and a follower 68 is provided on the second housing element. These may be part of the hinge assembly 16 (FIG. 1) positioned inboard or outboard of the slidable coupling. Of course, the identification of the first and second housing elements is solely for differentiation, and it is understood that the cam surface can be on either one of the housing elements, as can the follower, as long as the two can communicate.

The cam surface 66 includes profile 70, upon which the follower 68 traverses when proceeding between the collapsed and deployed orientations of the first and second housing elements. The profile may include a number of different regions. For example, a first region corresponding to a range between the collapsed orientation and a partially deployed orientation may be defined. In such a region, the cam profile, along with the biasing member 60 directs the follower to the collapsed orientation. Additionally, in the first region, the cam surface directs the follower so that the second housing translates relative to the second hinge member along the slidable coupling from the compressed position to the extended position.

Further a second region can be defined which extends from a partially deployed orientation and a fully deployed orientation. In such a region, the follower and the cam surface can be such that, with the aid of the biasing member, the follower is essentially pressed against the cam surface and remains in the set position along the cam surface. User intervention is required to move the two housing elements relative to each other.

Along some regions, such as the second region described herein, a detent 76 may be positioned along the cam surface corresponding to certain advantageous orientations of the first and second housing elements to provide a predetermined retaining point. As such, a user can with easy repetition quickly position the housing elements in particularly desirable orientations, as the follower will experience increased force requirements for further movement after reaching and interfacing with a detent (i.e., the detent forms a stable equilibrium point for the follower).

For example, a detent may be provided in an orientation wherein the first housing element and second housing element are in an orientation which is well suited for typing on a keyboard and viewing the results thereof on a screen, or watching a screen. One such detent may be provided when the two housing elements are in a flat orientation (i.e., when the two housing elements define an included angle of 180°). Another such detent may be provided when the two housings are displaced approximately 120° to 160°, for example. It is contemplated that a multitude of detents may be provided along the profile of the cam.

Furthermore, it will be understood that the first and second region may be adjoining, or may be separated by additional regions, and further regions may be on either side of the first and second regions. Additionally, the profile of the cam is not limited to any particular number of regions, or any particular configuration of regions. Further still, detents may be positioned along any portion of the profile of the cam without regard to any particular region thereof.

In certain embodiments, a damper 80 (FIG. 2a) may be provided to dampen the forces exerted by the spring, and to, in certain instances, limit the velocity and/or change, in the movement of the slidable coupling 56, and in turn, the translation of the second housing between the compressed and extended positions. In certain embodiments, the damper may comprise the interference fit or a friction surface interference between the piston 57 and the chamber 58 and the dimensional relationship between the two components. In other embodiments, the damper may comprise a separate member, such as a shock or other dampening device which typically relies on fluid motion and internal properties, such as the viscosity thereof.

Figure 4:
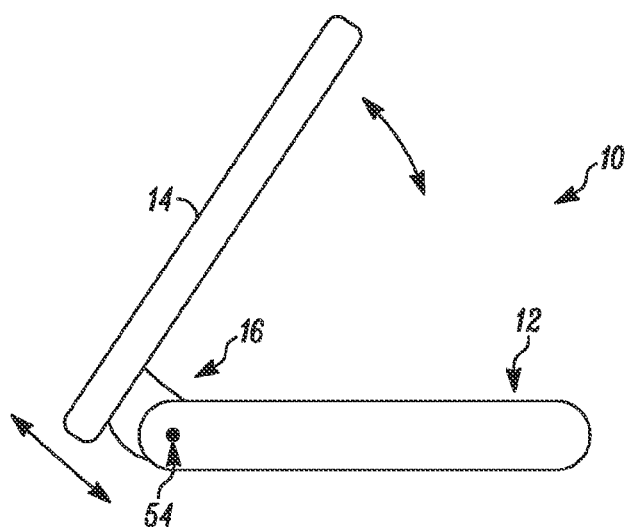
FIG. 4 of the drawings is a side elevational view of the electronic device of the present disclosure, showing, in particular, the rotative and translative movement of the housing elements relative to each other.
Figure 5A:
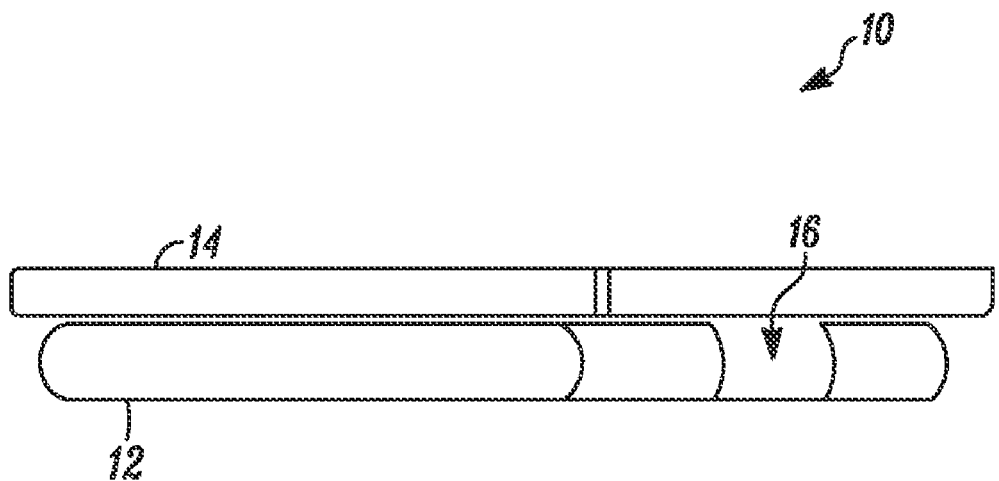
FIG. 5a of the drawings is a perspective view of the electronic device of the present disclosure, showing, in particular, the hinge assembly in the collapsed orientation in the compressed position.
Figure 5B:
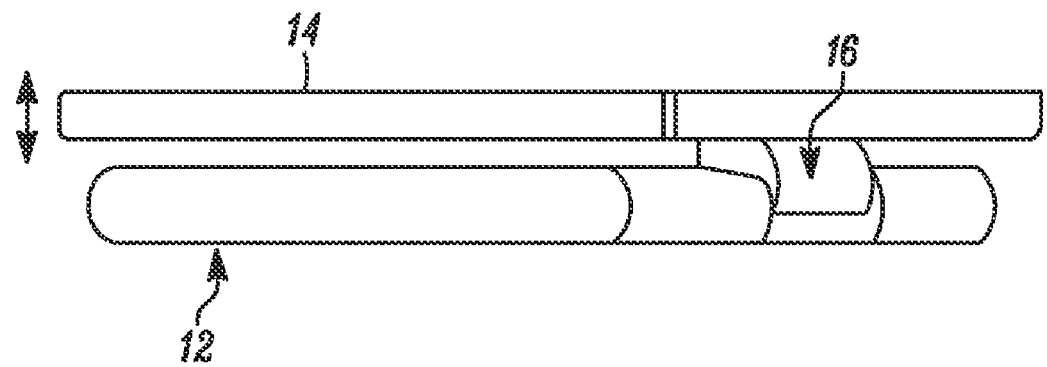
FIG. 5b of the drawings is a perspective view of the electronic device of the present disclosure, showing, in particular, the hinge assembly in the collapsed orientation and in the extended position.

In operation, one exemplary embodiment will be described. In such an embodiment, the electronic device comprises a mobile telephone of the smartphone type. The first housing element includes at least a screen on the inward surface thereof. The second housing includes at least a keyboard on the inward surface thereof. Again, it will be understood that the disclosure is not limited to any such configuration, and that such a configuration is merely for illustrative purposes. For example, such an embodiment may further include a screen on the outward surface of the first housing element, or simply a housing on the outward surface of the first housing element. Such an embodiment is shown in FIG. 1. It will be understood that, as is shown in FIG. 4, the two housing elements can both translate relative to each other proximate the hinge assembly and also rotate relative to each other. These functions can be independent, as is shown in FIGS. 5a and 5b, sequentially, wherein the two housing elements are translated relative to each other, but not rotated.

With reference to FIGS. 3a and 3b, sequentially, as the user opens the mobile telephone from a collapsed orientation toward a deployed orientation, the profile is configured to slidably translate the second housing outwardly from a compressed position toward an extended position. The translation via the slidable coupling allows the side end of the second housing element to extend beyond the first housing element without interference. Advantageously, with the slidable coupling 56 of the second housing element, the side end of the second housing can more closely abut (or even overhang) the first housing element, without interference between the two side ends during movement between the collapsed orientation and the deployed orientation. Additionally, substantially greater design freedoms are presented inasmuch as the first housing element and the second housing element can be separated during opening to overcome any design features on either of the housing elements.

With reference to FIGS. 3a and 3b, it will be understood that the cam surface 66 and the follower 68 control the slidable translation of the second housing element relative to the first housing element. In the embodiment shown, further rotation of the housing elements toward the deployed orientation direct the second housing element to remain in the fully extended position. Detents, such as detent 76, are provided along the profile 70 of the cam surface 66 to provide a retaining point. In greater detail, detent 76 is provided to allow the follower to easily be directed to an orientation wherein the included angle between the first housing element and the second housing element is particularly well suited for viewing the screen when the outward surface of the second housing element is placed on a flat surface.

It will further be understood that the user can further direct the housing elements to a fully deployed orientation. Alternatively, the user can further direct the housing elements toward a collapsed orientation. In the embodiment shown in FIGS. 3a and 3b, the profile of the cam is configured so that at an included angle of approximately less than 90°, the profile is such that, in cooperation with the biasing member, the housing elements are directed into the collapsed orientation. Thus, inadvertent movement through relatively small angles will prompt the biasing member to return the housing elements toward the collapsed orientation.

Again with reference to FIGS. 5a and 5b, sequentially, it will also be understood that the two housing elements can be separated from each other when in the collapsed orientation without rotating the housing elements by overcoming the biasing member. Such a feature allows for the storage of items between the inward surfaces of the two housing elements. For example, credit cards, money and the like can be placed between the two housing elements. The biasing member will apply a force to return the housing element to the compressed position, thereby retaining such items therebetween.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An electronic device comprising: a first housing element having an inward surface and an outward surface and a side end; a second housing element having an inward surface and an outward surface and a side end; and a hinge assembly coupling the first housing element and the second housing element about the respective side ends of the first and second housing elements and facilitating rotation between a collapsed orientation wherein the inward surfaces of the first and second housings are in an overlying orientation to a deployed orientation wherein the first and second inward surfaces are angularly disposed relative to each other, wherein the hinge assembly further includes: a first hinge member fixed to the first housing element; and a second hinge member slidably coupled to the second housing element, the first and second hinge members being rotatably coupled to each other about an axis of rotation such that the second housing element rotates relative to the first housing element and also translates relative to the first housing element and the second hinge member between a compressed position and a fully extended position; wherein the hinge assembly further includes a biasing member having a first end fixed to the second housing element and a second end fixed to the second hinge element, wherein the biasing member biases the second hinge element relative to the second housing toward the compressed position; and wherein the hinge assembly further includes a cam surface fixed to the first housing element and a follower coupled to the second housing element, whereupon relative movement of the first and second housing members about the axis of rotation directs the follower along the cam surface, and wherein the biasing member further biases the follower against the cam surface.

2. The electronic device of claim 1 wherein the cam includes a profile, the profile including a first region corresponding to a range between the collapsed orientation and a partially deployed orientation, wherein the first region, in cooperation with the biasing member directs the follower to the collapsed orientation.

3. The electronic device of claim 2 whereupon rotation of the first housing element relative to the second housing element along the first region from the collapsed orientation to the partially deployed orientation translates the second housing relative to the second hinge member along the slidable coupling from the compressed position toward the extended position.

4. The electronic device of claim 2 wherein the profile includes a second region corresponding to a range between a partially deployed orientation and the fully deployed orientation, whereupon positioning of the follower against the cam surface in the second region thereof, the biasing member and the second region of the profile preclude movement of the follower relative to the cam surface without further user interaction.

5. The electronic device of claim 4 wherein the second region further includes at least one detent positioned in the cam surface, the detent providing a retaining point for the follower in a predetermined position along the second region of the profile.

6. The electronic device of claim 1 wherein the biasing member comprises a spring.

7. The electronic device of claim 1 wherein the biasing member comprises a pressure differential device.

8. The electronic device of claim 1 wherein the second hinge element comprises a piston member and the second housing element includes a chamber along which the piston member is slidably movable, to, in turn, allow the piston member to telescope relative to the chamber.

9. The electronic device of claim 8 wherein the biasing member is positioned within the chamber, so as to be encased therein.

10. The electronic device of claim 1 wherein the first housing element further includes a keyboard, and the second housing element further includes a display.

11. The electronic device of claim 1 further comprising a damper coupled to the second housing element and the second hinge element, to, in turn, dampen translative movement of the second housing element relative to the second hinge element.

12. The electronic device of claim 1 wherein the second hinge element is mounted in an orientation that is spaced apart from a side edge of the second housing element, to in turn, have a portion of the second housing element that extends beyond the hinge assembly.

13. The electronic device of claim 12 wherein the first hinge element is mounted in an orientation that is less spaced apart from a side edge of the first housing element, than the second hinge element is spaced apart from the side edge of the second housing element, to, in turn, have a portion of the second housing element that extends beyond the side edge of the first housing element to, in turn, define an overhanging portion of the second housing element when the first and second housing elements are in a collapsed orientation.

* * * * *